United States Patent [19]
Wynne

[11] 3,937,867
[45] Feb. 10, 1976

[54] COUPLER FOR ELECTRIC FURNACE ELECTRODES

[75] Inventor: Peter J. Wynne, Pittsburgh, Pa.

[73] Assignee: Lectromelt Corporation, Pittsburgh, Pa.

[22] Filed: Sept. 23, 1974

[21] Appl. No.: 508,510

[52] U.S. Cl. ................................................ 13/18
[51] Int. Cl.² ........................................ H05B 7/10
[58] Field of Search ................ 13/18; 29/25.19, 240

[56] References Cited
UNITED STATES PATENTS 3,795,753   3/1974   Mori et al. ........................... 13/18
3,796,818   3/1974   Yuasa et al. ......................... 13/18

*Primary Examiner*—R. N. Envall, Jr.
*Attorney, Agent, or Firm*—Fred Wiviott

[57] ABSTRACT

An electric furnace electrode coupler comprises a power driven chain loop which wraps tightly around a new electrode section such that when the belt is translated the new section is turned and screwed onto an operating old electrode section. Means are provided for tensioning the chain for gripping. The drive mechanism for the chain is mounted on an extensible and swingable arm for enabling operation on several electrodes associated with one furnace.

23 Claims, 2 Drawing Figures

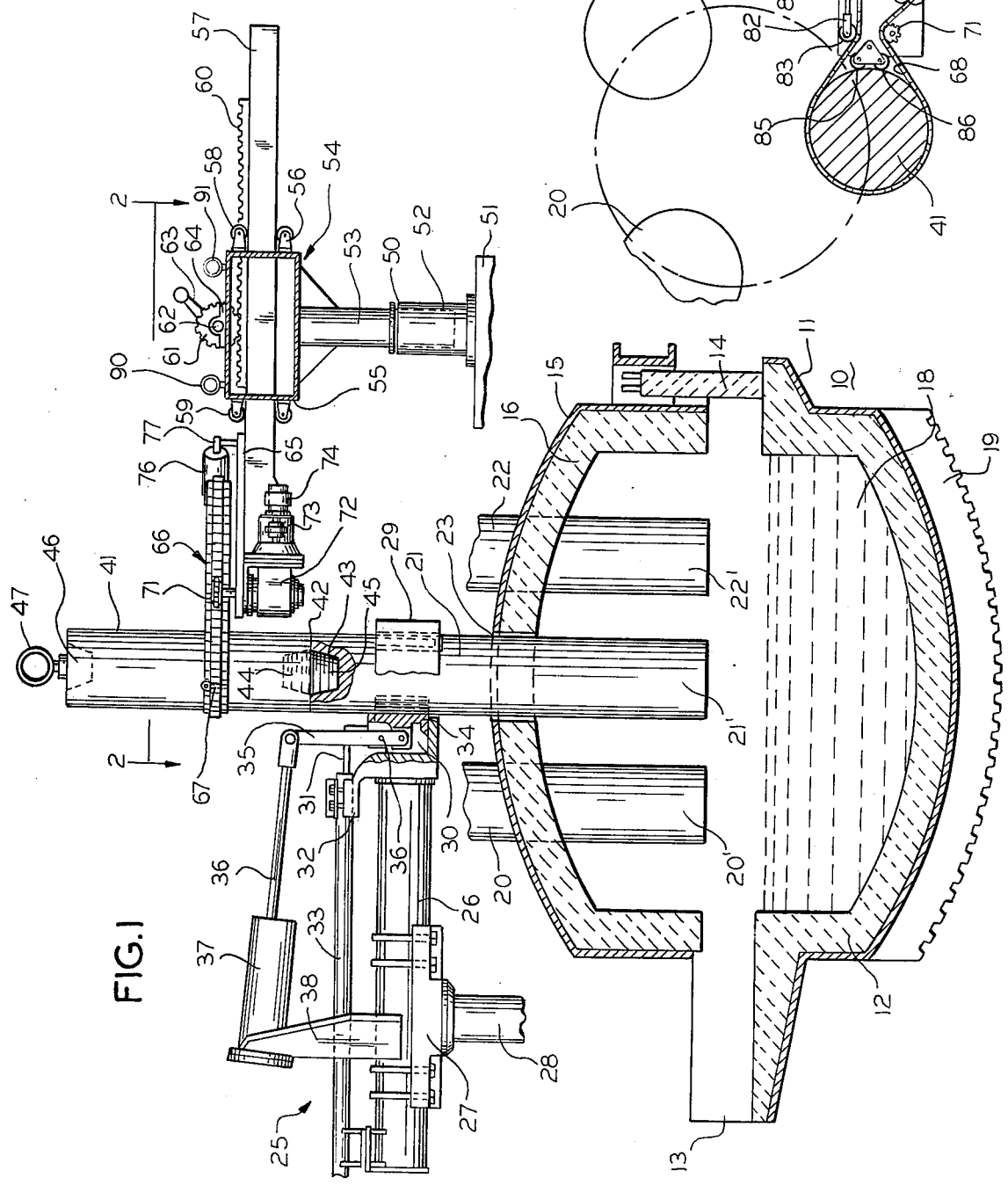

COUPLER FOR ELECTRIC FURNACE ELECTRODES

BACKGROUND OF THE INVENTION

This invention relates to a device for adding a new electrode section to the end of an existing electrode associated with a consumable electrode electric arc furnace.

In an electric arc furnace each electrode is supported in a clamp on an arm which is automatically adjustable to maintain the proper arc length between the lower tip of the electrode and the charge in the electric furnace. As the lower end of the electrode is consumed it is allowed to slide downwardly in the clamp and a new electrode section is then added to the upper end. This operation has heretofore involved several workmen who screwed on a new electrode section by the use of special tools. Besides being time consuming, the operation exposed the workmen to the uncomfortably hot and gaseous environment existing above an operating electric furnace.

SUMMARY OF THE INVENTION

An object of the present invention is to provide a device for coupling a new electrode section to an existing electrode such that there will be reduced involvement and effort by the operator and less exposure to the uncomfortable environment that exists above an electric furnace.

A further object of this invention is to provide a device which uses a chain loop to grip the new electrode section and to turn it for coupling under the influence of a drive mechanism.

Yet another object is to provide a device which is adjustable to enable operation on any one of several electrodes associated with an electric arc furnace and which is readily transportable to the site of one or more other arc furnaces for use therewith.

Briefly, the new device comprises a pedestal which may be positioned to swing about a vertical axis in a stationary stand. A cross arm is supported on the pedestal and it is adapted for extension and retraction toward and away from an electrode. One end of the arm supports a drive mechanism for a closed loop chain which can be detached or opened to wrap it around a new electrode section loosely. Means are provided to impose tension on the chain and thereby effect a firm grip on the new electrode section. Motor means are provided to translate the chain to turn gripped electrode onto the free end of the old electrode.

How the foregoing and other more specific objects of the invention are achieved will be evident in a more detailed description of a preferred embodiment of the invention which will be set forth below in reference to the drawing.

BRIEF DESCRIPTION OF THE DRAWING

FIG. 1 is an elevation view of the new electrode coupling device associated with an electric arc furnace, shown schematically and in section, in conjunction with an electrode supporting arm and clamp assembly; and FIG. 2 is a plan view of the new coupling device as viewed generally in the direction of the line 2—2 in FIG. 1.

DESCRIPTION OF A PREFERRED EMBODIMENT

In FIG. 1 a typical electric arc furnace with which the new electrode coupling device may be used is generally designated by the reference number 10. The furnace comprises a metal shell 11 which is lined with refractory material 12 and has a pouring spout 13. The furnace has a sliding door 14 which serves customary purposes known to those skilled in the art. The furnace is also provided with a removable cover 15 comprising a metal shell and a refractory lining 16. As shown, the bottom of the furnace is occupied by a molten charge 18. The furnace body is on toothed rocking members 19 to facilitate tilting the furnace on a toothed rack, not shown.

The illustrated furnace has three electrodes 20, 21 and 22 extending through suitable sealed openings such as 23. The electrodes are subject to automatic vertical adjustment during furnace operation to maintain the arc length between their lower tips 20', 21' and 22' and the top surface of the molten charge 18.

Each electrode is supported on an electrode arm and clamp assembly, one of which is shown and generally designated by the number 25. The arm assemblies may be conventional since their purpose is to support the electrodes so their lower tips may be maintained at the proper distance for arcing to the molten mass 18 in the furnace. The arm assembly 25 comprises an arm 26 clamped in a cradle 27 that is fastened to the upper end of a vertically adjustable post 28. The means for adjusting the post for maintaining proper arc length during furnace operation and for retracting the electrode from the furnace is not shown and may be any well-known type. At the end of arm 26 there is an electrode clamp 29 which is shown encircling an electrode 21. This electrode arm and clamp assembly is similar to one shown in U.S. Pat. No. 3,072,732 and reference may be made to that patent for the details. Clamp 29 has a cooling water cavity 30 which is supplied with water from a tube 31. Integral with the clamp is a connector 32 which holds a bus tube 33 through which electric power is supplied to the electrode. The clamp has a movable shoe 34 for frictionally holding electrode 21. Force is applied to the clamp shoe 34 by means of an operating lever 35 pivotally connected at its lower end to shoe 34 and fixedly pivoted adjacent said lower end on pivot yoke 36 which is carried near the upper end of cavity 30 so that counterclockwise rotation of lever 35 will move clamp shoe 34 toward electrode 21. Operating lever 35 is actuated by means of push-pull rod 36 coupled to a piston, not visible, of an air or hydraulic cylinder 37 which is suitably supported above arm 26 by a bracket 38. Electrode 21 may be released by supplying fluid under pressure to cylinder 37 which causes rod 36 to shift to the right as shown so that lever 35 rotates clockwise to withdraw clamping jaw 34 away from electrode 21. As is known, during furnace operation electrode 21 is held tightly by clamp 29. When a sufficient amount of the lower tip 21' of the electrode has been consumed in the furnace, the electrode may be allowed to rest on the melt 18 or the bottom of the furnace and clamp 29 may be released and the arm 26 raised to allow the clamp to be slid upwardly on electrode 21 and reengaged. A new electrode section 41 may then be coupled with the upper end of existing electrode 21.

In FIG. 1 a new electrode section 41 is shown coupled to existing electrode 21 by using the new electrode coupling device. The joint between the old and new electrodes is marked 42. Before discussing the new coupling device it should be observed that the upper end of the old electrode may be provided with a tapered internally threaded hole 43 and, in this case, the bottom of the new electrode section 41 is also provided with an internally threaded tapered hole 44. New electrode section 41 is coupled to old electrode 21 with an externally threaded and tapered connector 45 which is known in the art. Threaded connector 45 may be metallic or it may be composed of carbon or graphite similarly to electrode 21 and any sections such as 41 that are added thereto.

Any suitable screw type connector may be used in place of connector 45. For example, a portion of the lower end of the new electrode section 41 may be reduced in diameter such that the extending portion may be threaded in which case the connector is inseparable from the new section. This may cooperate with a threaded hole such as 43 in the upper end of the electrode section to which the new section 41 is to be joined.

The new electrode section 41 may be positioned substantially coaxially with the existing electrode 21 in preparation for coupling the old and new electrode section with the aid of a crane. To facilitate this, an externally threaded tapered plug 46 is screwed into the upper end of new electrode section 41. There is a lifting eye 47 screwed or cast into plug 46 to enable handling the new electrode section 41 with a crane.

The construction of the new device for connecting new electrode sections such as 41 to existing electrodes such as 21 will now be described in greater detail. As can be seen in FIGS. 1 and 2, the device comprises a stand 50 which may be anchored on a walkway 51 generally above and adjacent the electric furnace. Stand 50 provides a socket 52 into which a pedestal 53 may be inserted. Mounted on the top of pedestal 53 is an arm guide 54 which may be an open frame or a box of any suitable structure. The opposite ends 55 and 56 of the guide structure have aligned openings through which a slidable arm 57 extends. The arm 57 is mounted for sliding on sets of rollers such as set 58 at one end of the guide structure and set 59 at the other end.

Fastened to the top of arm 57 is a toothed rack 60 which is engaged by a driving pinion 61 that is keyed to a shaft 62 having a manually operable crank 63. Shaft 62 is journaled in bearing blocks 64 which are mounted on guide structure 54. It will be evident that crank 63 may be rotated in opposite directions to alternately advance and retract arm 57 relative to a furnace electrode such as 21. It will also be evident that arm 57 may be directed toward any of several triangularly arranged or otherwise spaced apart furnace electrodes 20–22. This is possible as a result of arm 57 being on a pedestal 53 which is rotatable about a vertical axis in socket 52 of stand 50.

Fastened to one end of slidable arm 57 is a base plate 65 on which is mounted the mechanism for coupling a new electrode section 41 to an existing electrode 21.

The coupling mechanism comprises flexible loop means such as a belt or a roller chain 66 which may be made in several sections adapted for being connected as a closed loop. The chain sections may be connected and disconnected by inserting or withdrawing one of several disconnect pins 67. When any pin 67 is removed, the loop is open for placing it around new electrode section 41 which will then be held by a crane by means of eye 47 and coaxially aligned with electrode 21. The tapered threaded connector 45, of course, facilitates centering and aligning new section 41 and existing electrode 21.

The inside of roller chain 66 is faced with neoprene 68 to avoid scoring the periphery of the electrode if the chain should slip and to enhance friction. Other tough and pliable friction producing materials can be substituted for neoprene.

When the disconnect pins 67 are in place and roller chain 66 is formed in a loop, the chain runs over a pair of idler sprockets 69 and 70 which are journaled for rotation on base member 65. The chain is driven translationally with a sprocket 71 that is on the shaft of a speed reducer 72 which is mounted on the bottom of base plate 65. A coupling 73 joins the input shaft of the speed reducer to the output shaft of a motor 74. Any suitable type of motor may be used such as an electric or hydraulic type but an air motor is preferable because an air hose with a quick coupling is usually available in the furnace plant. Mounted on top of base plate 65 is a fluid operated cylinder 76 which enables imparting tension to the closed loop chain 66. Cylinder 76 may be an air or hydraulically operated type. The cylinder is mounted on a pivot 77. The operating rod 78 of the cylinder is joined by a clevis 79 to a bell crank 80 which is journaled on a shaft 81. At the end of one arm of the bell crank there is a yoke 82 on which a sprocket or roller 83 is journaled. It will be evident that pressurization of cylinder 76 will cause rod 78 to extend therefrom, thereby rocking bell crank 80 and causing roller 83 to press against roller chain 66 for imparting tension to it when the chain loop is closed and wrapped around new electrode section 41. This tension causes the portion of chain 66 which is wrapped tightly around new electrode section 21 to grip it sufficiently to enable turning the electrode section when roller chain 66 is translated under the influence of driving sprocket 71.

At the outboard end of base plate member 65 adjacent new electrode section 41 is a pivotally mounted roller bracket 84. This bracket has at least a pair of spaced apart rollers 85 and 86 whose peripheries make tangential contact with the periphery of electrode section 41. Thus, rollers 85 and 86 serve to preserve the coaxial alignment of the new and existing electrode sections by counteracting the tilting force developed by roller chain 66 when it is placed in tension.

It will be appreciated that various means could be used for imparting tension to roller chain 66 after it is pinned together to form a closed loop around new electrode section 41. For example, the bell crank supported idler roller 83 could be journaled stationarily and either of the idler sprockets could be on slidable blocks, not shown, so as to be movable bidirectionally with a force producing device, not shown, to produce and relieve tension in the flexible loop 66.

The operational sequence for attaching a new electrode section 41 to existing electrode 21 involves the steps of lowering electrode arm 26 to thereby lower electrode 21 so that its tip bears on the bottom interior of the furnace or on a charge therein. Electrode clamp 29 is then released and electrode arm assembly 25 is elevated to very near the top of the existing electrode 21 which is then reclamped to assure that it will not turn. The chain loop is then opened by removing one of the disconnect pins 67 and a new electrode section 41 is positioned in coaxial alignment with electrode 21 by means of a crane hook engaged with lifting eye 47. New section 41 is lowered slightly to start the end of the tapered and threaded connector plug 45 into its internally threaded mating hole 43. The roller chain is then repinned to form a closed loop.

Fluid operated cylinder 76 is then pressurized to impose tension on roller chain 76 by means of pulley 83. This draws the periphery of electrode section 41 tightly against rollers 85 and 86. At this juncture it may be necessary to advance or retract support arm 57 of the coupling device by means of manual crank 63 to secure optimum vertical alignment between existing electrode 21 and new section 41. Motor 73 is then energized to cause roller chain 66 to translate and impart rotation to new electrode section 41 while the old section is prevented from turning by clamp 29. The section is turned until the motor stalls or the chain 66 slips on section 41 at which time the new section is assuredly screwed tightly onto the old.

After this procedure is completed with respect to one electrode on the furnace, the roller chain 66 may be opened by removal of one of the disconnect pins 67. This permits the support arm 57 of the coupler device to be swung into alignment with one of the other electrodes on the same furnace if conditions call for adding a new section to any of the other electrodes. The screw plug 46 and its crane hook eye may be reused for adding other electrode sections.

The electrode coupling device may be used with several electric furnaces in the same plant by transporting it from furnace to furnace with a crane. For this purpose at least a pair of lifting eyes 90 and 91 are installed in the top of guide structure 54. The whole guide, support arm, drive mechanism and pedestal 53 may then be transported as an entity to another furnace location where there is provided a socketed stand 50 in which pedestal 53 may be inserted.

Although a preferred embodiment of the new electrode coupling device has been described in considerable detail, such description is to be considered illustrative rather than limiting for the invention may be variously embodied and is to be limited only by interpretation of the claims which follow.

I claim:

1. A device for coupling a new furnace electrode section to another electrode section previously operatively associated with said furnace comprising:
   a. a flexible means for being formed into a loop to enclose at least one of said electrode sections and to dispose at least a portion of said flexible means in gripping engagement with at least a portion of the periphery of one electrode section, and
   b. means for translating said flexible means to effect turning of said at least one electrode section when said flexible means is in gripping engagement therewith.

2. The device set forth in claim 1 including:
   a. means for imparting tension in said flexible means to enhance the gripping engagement between said flexible means and said one electrode section.

3. The device set forth in claim 2 including:
   a. means for selectively disconnecting and connecting adjacent portions of said flexible means to enable passing said flexible means around said electrode section and to form a loop which encloses said electrode section.

4. The device set forth in claim 1 wherein:
   a. said flexible means is a chain means and said device includes,
   b. arm means mounted for being extended and retracted toward and away from said another electrode section,
   c. a plurality of sprocket means supported by said arm means and arranged for being engaged by said chain means, said sprocket means defining the translational path of said chain means,
   d. motor means operatively coupled with at least one of said sprocket means for turning said sprocket means to effect translation of said chain means,
   e. movable supporting means for another of said sprocket means, and
   f. means for selectively moving said movable supporting means in one direction for causing said another sprocket means to press against said chain means to impart tension thereto and effect increased gripping engagement with said electrode section and for moving said supporting means in another direction to relieve said tension.

5. The device set forth in claim 1 including:
   a. arm means,
   b. means for supporting said arm means for being advanced and retracted toward and away from said another electrode section in a line substantially perpendicular to the axes of said section,
   c. motor means supported on said arm means,
   d. means for coupling said motor means to said flexible means for said motor means to translate said flexible means and thereby rotate said one electrode section, and
   e. means for pressing against said flexible means to impart tension therein for enhancing the gripping engagement between said flexible means and the periphery of said one electrode section.

6. The device set forth in claim 5 including:
   a. roller means mounted on said arm means and being constructed and arranged for contacting the periphery of said one electrode section for resisting any bending force imposed thereon by said flexible means.

7. A device for coupling a new furnace electrode section to an electrode previously operatively associated with said furnace comprising:
   support means mounted for pivotal movement about an axis generally parallel to the axis of said electrode,
   said support means including translatable means advanceable and retractable relative to said electrode axis and first drive means for selectively moving said translatable means,
   electrode engaging means for releasably engaging said electrode section and being mounted on said translatable means for movement therewith whereby the electrode section engaged thereby may be moved into axial alignment with said electrode,
   and second drive means coupled to said electrode engaging means for moving the same in a path around the axis of said electrode for rotating said electrode section into coupling engagement with said electrode.

8. The device set forth in claim 7 wherein said electrode engaging means comprising elongate flexible means and including first means for moving said elongate flexible means into and out of engagement with said electrode.

9. An electric furnace assembly comprising:
a. a furnace,
b. an elongated electrode extending from the outside to the inside of said furnace the end portion of said electrode inside of said furnace being consumable,
c. an electrode support means coupled to said electrode and for supporting the same,
d. coupling means for coupling a new electrode section to said electrode endwise thereof and outside of said furnace, said electrode and said section being constructed and arranged such that they may be coupled in an endwise relation by relative rotation about a common axis,
e. said coupling means comprising first means for releasably engaging the periphery of said electrode section, second means for moving said first means into gripping engagement with said section, and third means for translating said first means about the axis of said section for securing the same to said electrode,
f. pivot means,
g. support means mounted on said pivot means for movement toward and away from said electrode in a line substantially perpendicular to the axis of said electrode, said coupling means being mounted on said support means for movement therewith into operative engagement with said electrode, and
h. bidirectional drive means supported on said pivot means and means coupling said drive means to said support means for advancing and retracting said support means to facilitate aligning said electrode section with said electrode.

10. The device set forth in claim 9 wherein said pivot means is mounted for pivotal movement about an axis generally parallel to the axis of said electrode, said support means being mounted on said pivot means for movement normal to the axis of said pivot means.

11. The device set forth in claim 10 wherein said support means comprises elongate arm means, said first means being mounted adjacent one end of said arm means, said bidirectional drive means engaging said arm means at a point spaced from said first means whereby said section may be coupled to any one of a plurality of electrodes spaced at different distances from the axis of said pivot means.

12. The device set forth in claim 9 wherein said furnace includes a plurality of electrodes, said pivot means and said support means being operative to position said first means adjacent each of said electrodes for selectively affixing new electrode sections thereto.

13. An electric furnace assembly comprising:
a. a furnace,
b. an elongated electrode extending from the outside to the inside of said furnace, the end portion of said electrode inside of said furnace being consumable,
c. an electrode support means coupled to said electrode and for supporting the same,
d. coupling means for coupling a new electrode section to said electrode endwise thereof and outside of said furnace, said electrode and said section being constructed and arranged such that they may be coupled in an endwise relation by relative rotation about a common axis,
e. said coupling means comprising first means for releasably engaging the periphery of said electrode section, second means for moving said first means into gripping engagement with said section, and third means for translating said first means about the axis of said section for securing the same to said electrode,
f. said first means comprising a flexible means for being formed into a loop to enclose said electrode section and to dispose at least a portion of said flexible means in gripping engagement with at least a portion of the periphery of said electrode section, and
g. said third means comprising means for translating said flexible means to effect turning of said electrode section when said flexible means is in gripping engagement therewith.

14. The device set forth in claim 13 wherein said second means comprises means for imparting tension in said flexible means to enhance the gripping engagement between said flexible means and said one electrode section.

15. The device set forth in claim 14 including:
a. means for selectively disconnecting and connecting adjacent portions of said flexible means to enable passing said flexible means around said electrode section and to form a loop which encloses said electrode section.

16. The device set forth in claim 15 wherein:
a. said flexible means comprises a roller chain,
b. said motor means includes a drive sprocket engageable with said roller chain whereby rotation of said drive sprocket will translate said roller chain.

17. The device set forth in claim 16 including:
a. a pliable material on the side of said roller chain that engages the periphery of said electrode section.

18. The invention defined in claim 17 wherein:
a. said support means comprises arm means,
b. arm support means supporting said arm means on said pivot means for said generally transverse movement,
c. said pivot means supporting said arm support means for swinging about an axis substantially parallel with the axes of said electrodes for enabling alignment of said arm means with a selected electrode.

19. The invention set forth in claim 18 wherein said bidirectional drive means comprises a shaft journaled for rotation on said arm support means and a pinion affixed on said shaft, and a toothed rack fixed on said arm means whereby rotation of said shaft will advance and retract said arm means.

20. The invention set forth in claim 19 wherein:
a. said pivot means for supporting said arm supporting means for swinging comprises a column means and a stationary socket means near said furnace for receiving and holding said column means.

21. The device set forth in claim 20 including:
a. idler means mounted for rotation on said arm means and engageable with said flexible means when the latter is formed as a loop,
b. a rotatable element and means for urging said element against said flexible means when it is formed as a loop to impart tension to said flexible means and thereby enhance gripping engagement with said electrode section.

22. The device set forth in claim 20 including:
a. a plurality of rotatable idler means on said arm means for said flexible means to run against when said flexible means is enclosing said one electrode section, b. movable means supporting at least one of said idler means for movement, and c. means for moving said movable means toward said flexible means for said at least one idler means to press against said flexible means and increase the tension therein.

23. The invention set forth in claim 22 wherein:

a. said means for moving said rotatable means for tensioning said flexible means comprises a bell crank pivotally mounted on said support means and on which said rotatable means is mounted for rotation, b. a fluid operated cylinder means mounted on said support means and operatively coupled with said bell crank to swing said crank about its pivot.

* * * * *